United States Patent [19]
Verwey

[11] 3,940,045
[45] Feb. 24, 1976

[54] MANUALLY POSITIONABLE WORK ELEMENT

[75] Inventor: William G. A. Verwey, Phoenix, Md.

[73] Assignee: Precision Industries, Inc., Baltimore, Md.

[22] Filed: Oct. 2, 1974

[21] Appl. No.: 511,497

[52] U.S. Cl. .................... 227/101; 227/152; 82/31; 269/74; 269/94
[51] Int. Cl.$^2$ .......................................... B27F 7/02
[58] Field of Search .......... 269/74, 91, 94; 227/152, 227/101; 100/226; 83/425.4, 498, 499, 534; 82/31

[56] References Cited
UNITED STATES PATENTS

| 185,682 | 12/1876 | Johnson | 82/31 |
|---|---|---|---|
| 364,307 | 6/1887 | See | 82/31 |
| 2,497,504 | 2/1950 | Kronouer | 82/31 |
| 2,574,281 | 11/1951 | Olson | 269/91 X |
| 2,953,174 | 9/1960 | Wilkins | 269/94 |

Primary Examiner—Granville Y. Custer, Jr.
Attorney, Agent, or Firm—Lerner, David, Littenberg & Samuel

[57] ABSTRACT

A work element, such as a wire stitching head, is provided which is adapted to be manually advanced and positioned along a support rail. The work element is carried by a carriage adapted to be movably mounted on a support rail, said carriage including bearing means, such as roller means, operably connected thereto and adjustable between engaging and retracted positions and adapted to contact the support rail and facilitate movement of the carriage along the support rail when the bearing means is in its engaging position. Each carriage also includes selectively positionable securing means, such as clamping members, for preventing the advance of the carriage along the support rail when the bearing means is in its retracted position, which means are adjustably connected to the carriage and adapted to engage the support rail.

11 Claims, 2 Drawing Figures

MANUALLY POSITIONABLE WORK ELEMENT

FIELD OF THE INVENTION

This invention relates to a work element, such as a wire stitching head, which may be manually advanced and positioned along a support rail.

BACKGROUND OF THE INVENTION

Conventional box stitching machines include a stitching head mounted on a bridge frame for applying wire stitches to overlapping portions of a box blank passing therebeneath, and conveying means for advancing the box blank passed the stitching head. Box manufacturers employ such wire stitching apparatus in stitching boxes designed to hold extremely heavy contents.

One of the basic requirements of box stitching machines is that the stiches be applied at precisely desired locations, for example, with respect to the leading and trailing folds which define the intermediate body portion of the planar box blank. This requirement is, in part, satisfied by carefully controlling the path of the box blank passing beneath the stitching head. However, it is also necessary to accurately position the stitching head on the bridge frame vis-a-vis the path of travel of the box blank passing therebeneath. This may be accomplished automatically through the use of complex costly automatic electro-mechanical means.

Manual positioning of the stitching head on the bridge frame has been attempted with only moderate success. It has been suggested to employ rollers between the stitching head and bridge frame to achieve smooth and manual lateral movement of the stitching head. Unfortunately, it has been found that rollers cannot withstand the high shockloads imparted on them as the head goes through the stitching function. With no other feasible alternative available, the art has turned to the use of sliding pads to effect manual movement of the head. However, the sliding pads tend to wear quickly and do not provide for the desired smooth lateral movement.

SUMMARY OF THE INVENTION

In contradistinction to the prior art, the instant invention provides means for effecting manual smooth lateral movement of the stitching head along the bridge frame by employing bearing means, such as one or more rollers, in conjunction with one or more clamping means, which rollers are connected to the stitching head and include means for selectively moving the rollers between engaging and retracted positions. Thus, when the stitching head is performing its stitching function, the rollers will be in their retracted position and will not be subjected to the shockloads created by the stitching function, while the clamping means maintains the stitching head in secure contact with the bridge frame.

In its broadest aspect, the present invention relates to a work element, which may comprise a stitching head or other conventional types of work elements, which is adapted to be manually advanced and positioned along a support rail, such as a bridge frame. The work element or elements of the invention are carried by one or more carriages, adapted to be movably mounted on a support rail, each carriage including bearing means, such as one or more roller means or low friction pads, operably connected to the carriage and adjustable between rail engaging and retracted positon, and means for selectively positioning the bearing means between rail engaging and retracted positions. The bearing means is adapted to contact the support rail when in its rail engaging position and facilitate movement of the carriage along the support rail. The carriage also includes selectively positionable securing means connected to the carriage and adapted to engage the support rail to prevent the advance of the carriage along the support rail when the bearing means is in its retracted position.

The work element of the invention encompasses any element which may be moved and positioned along a support structure for example, relative to the transverse path of movement of another member, such as a stitching head laterally positioned relative to a bridge frame and the transverse path of movement of box blanks passing therebeneath. In addition, the work element of the invention encompasses two or more such elements which must be moved and positioned to vary the distance therebetween (such as in folders, feeders, counterejectors, palletizers, stackers, bundlers, or other equipment employed in the box making industry) and relative to the support structure.

DETAILED DESCRIPTION OF PREFERRED EMBODIMENTS OF THE INVENTION

Figure 1:
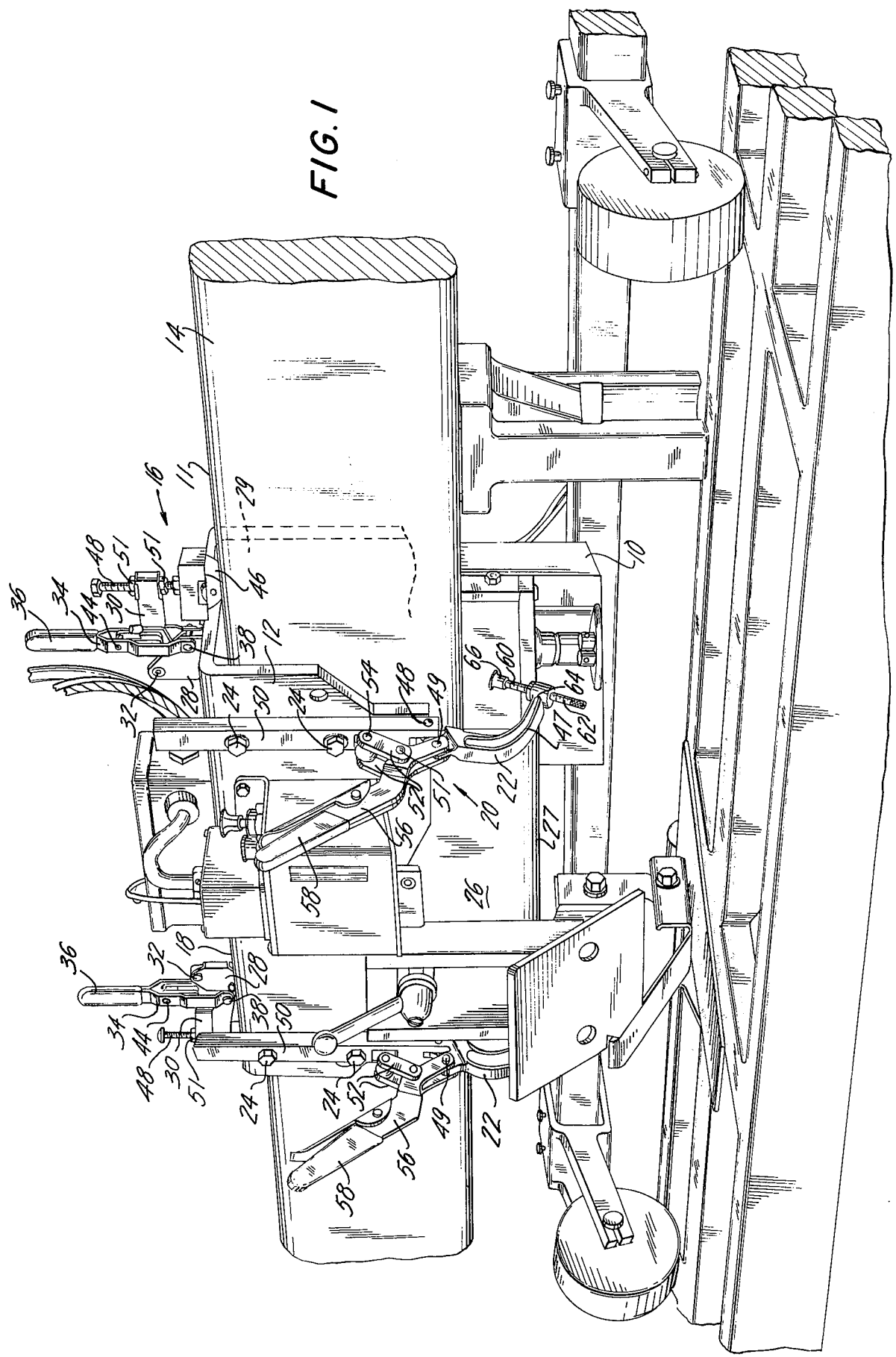
FIG. 1 is a view of a working element of the invention comprising a stitching head supported on a support rail, wherein the bearing means are in their rail engaging position for effecting movement of the stitching head along the support rail, and the selectively adjustable securing means are in the open position.
Figure 2:
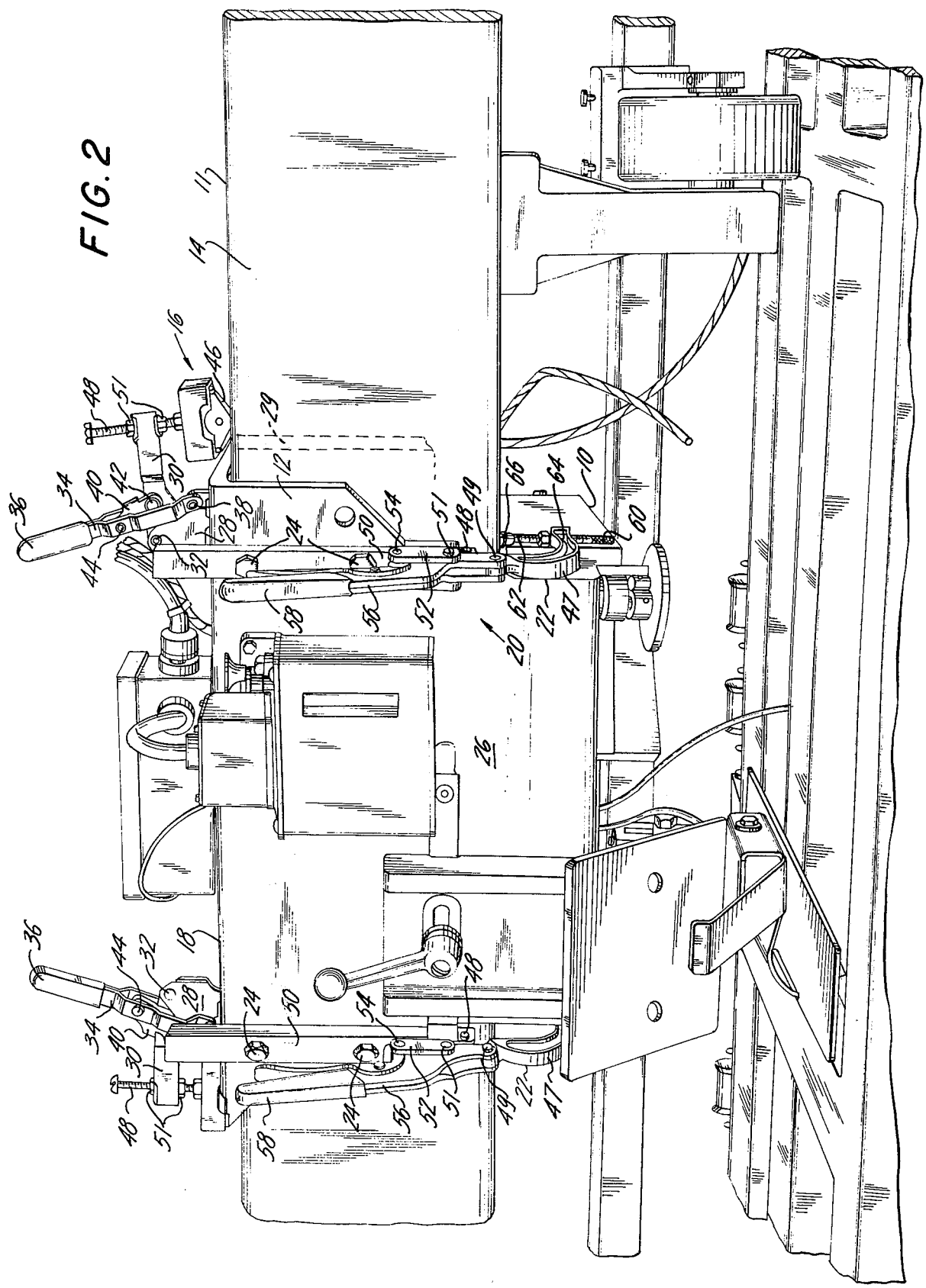
FIG. 2 is a view of the work element and support rail shown in FIG. 1 in position to effect a stitching function, wherein the bearing means are in their retracted position and the selectively adjustable securing means are in the closed position engaging the support rail.

Referring now to the accompanying Figures wherein like parts are referred to by like numerals in the several views, there is shown in FIGS. 1 and 2 the work element of the present invention in the form of a conventional stitching head identified generally by the numeral 10 and designed for use in conventional box wire stitching machines. The stitching head 10 is carried on a carriage 12, which as shown is preferably formed of square rectangular tubing including top wall 18, front face 26 and rear face 29, on which rear face the stitching head 10 is actually secured. The carriage 12 is mounted over and adapted to slide over a support rail, namely bridge frame 14, by means of bearing means, such as retractable roller means 16. The roller means 16 are mounted on top wall 18 of the carriage 12 near each end thereof and contact the top wall 11 of the bridge frame 14, the top wall 11 serving as a rail or track therefor. As will be seen, the roller means 16 are adapted to be adjusted between a rail engaging position as shown in FIG. 1 and a retracted position as shown in FIG. 2.

The top wall 11 of the bridge frame 14 may include an elongated recessed portion and/or may include upstanding guide rails to serve as quide means for the roller means 16.

Selectively positionable securing means generally indicated by the numeral 20 and preferably comprising a pair of adjustably positionable clamp members 22 are secured by means of bolts 24 to front face 26 of the carriage 12. The clamp members 22 are adapted to be adjusted between open or non-securing positions as shown in FIG. 1 when the roller means 16 are in their rail engaging positions so as to allow movement of the carriage 12 along the bridge frame 14, and closed or rail engaging positions as shown in FIG. 2 when the roller means 16 are in their retracted positions to prevent movement of the stitching head 10 when the stitching head 10 is ready to effect its stitching function. When the roller means 16 are in their rail engaging position as shown in FIG. 1, the stitching head can be manually moved along the bridge frame 14.

In the preferred embodiment of the invention, each of the roller means 16 include means for selectively positioning the rollers with respect to bridge frame 14 which means preferably takes the form of an over-center toggle mechanism which comprises a base member 28 which is connected by means of conventional machine screws to the top wall 18 of carriage 12. A first link member 30 is pivotally connected by means of pivot pin 32 to base member 28 as shown. A control member 34, which includes handle 36, is pivotally connected by means of pivot pin 38 to the base member 28 as shown. A second link member 40, best shown in FIG. 2 is pivotally connected by means of pivot pin 42 to the first link member 30 and is pivotally connected by means of pivot pin 44 to the control member 34. Roller 46 is connected to the first link member 30 via screw 48 carrying nuts 51 on either side of the first link member 30.

As will be seen hereinafter, the rollers 46 may be easily manually retracted from their rail engaging position shown in FIG. 1 to the retracted position shown in FIG. 2 by simply moving the handles 36 toward each other as shown in FIG. 2 Movement of handles 36 as described above, causes the second link member 40 to pivot upwardly about pivot pin 44 carrying with it the second link member 30 which in turn causes the roller 46 to move upwardly away from the top wall 11 of the bridge frame 14. The under surface of the top wall 18 of the carriage 12 will now fall slightly into contact with the top wall 11 of the bridge frame 14.

Where it is desired to move the carriage 12 along its bridge frame 14, the rollers 46 may be moved into their engaging position as shown in FIG. 1 by simply moving the handles 36 away from each other. Such movement of each of the handles 36 causes the second link members 40 to pivot about pins 44 downwardly carrying with it the first link members 30 which in turn causes the rollers 46 to move downwardly into engagement with the top wall 11 of the bridge frame 14. When the rollers 46 contact the top wall 11 of the bridge frame 14, the top wall 18 of the carriage 12 will be lifted slightly out of contact with the top wall 11 of the bridge frame 14. The carriage 12 is now ready for movement along the bridge frame 14.

It will be apparent that the screw 48 and associated nuts 51 provide a fine adjustment for the position of the roller 46 relative to the top wall 11 of the bridge frame 14.

In the preferred embodiment of the invention, the clamp members 22 each includes a base member 50 which is secured to the front face 26 of the carriage 12 by means of conventional bolts 24; a jaw member 47 pivotally connected by means of pivot pin 48 to the base member 50; a control member 56, which includes handle 58, pivotally connected by means of pivot pin 49 to the jaw member 47; and link members 52 pivotally connected by means of pivot pin 51 to the control member 56 and pivotally connected by means of pivot pin 54 to the base member 50. The jaw members 47 include adjustable engaging means 60 which, as shown, comprises a screw 62 which passes through a threaded passage in the end 64 of the jaw member 47. The screw 62 includes a frame engaging portion 66 which may take the form of a conventional rubber stopper or the like.

The clamp members 22 may be moved from their open (non-rail engaging) position as shown in FIG. 1 to their closed (rail engaging) position as shown in FIG. 2 by merely moving the handles 58 toward the base members 50 thereby causing the jaw members 47 to pivot about pins 48 and 49 and move into engagement with the bottom portion of the bridge frame 14.

It will be appreciated that the clamp members 22 will be in their open (non-rail engaging) position as shown in FIG. 1 when the rollers 46 are in their rail engaging position to facilitate movement of the carriage 12 along the bridge frame 14. Furthermore, the clamp members 22 will be in their closed (rail-engaging) positon as shown in FIG. 2, when the rollers 46 are in their retracted position, to secure carriage 12 to the bridge frame 14 during the stitching operation.

In operation, the clamping members 22 are moved to their open positions by moving the handles 58 away from the base members 50 to the positions shown in FIG. 1. The jaw members 47 are thereby moved out of engagement with the bottom portion of the bridge frame 14. The roller means 16 are then moved to their rail engaging positions by moving handles 36 toward each other to the position shown in FIG. 1. The rollers 46 are thereby made to move into contact with the top wall or track 11 of the bridge frame 14 thereby causing the undersurface of the top wall 18 of the carriage to be lifted slightly up from and out of engagement with the top wall 11 of the bridge frame 14. The carriage 12 can then be manually laterally moved on the rollers 46 along the bridge frame 14 to the desired predetermined position. Thereafter, the roller means 16 are moved to their retracted positions as shown in FIG. 2 by moving the handles 36 thereof toward each other to thereby cause the rollers 46 to be moved upwardly out from engagement with the top wall 11 of the bridge frame 14. The carriage 12 is thereby caused to drop slightly into contact with the top wall 11 of the bridge frame 14. Thereafter, the clamping members 22 are moved to their closed (rail-engaging) position by merely moving the handles 58 toward the base members 50 causing the jaw members 47 and the rail-engaging portions 66 thereof to move into engagement with the undersurface of the bridge frame 14. The carriage 12 is now securely mounted to the bridge frame 14 and is ready for stitching. Inasmuch as the rollers 46 are, at this juncture, out of contact with the bridge frame 14, they will not be subjected to the shockloads generated during the stitching function.

As indicated above, the work emement of the invention may encompass any element which may be moved and positioned along a support structure. Furthermore, the work element may comprise two or more work elements which may be positioned relative to each other and relative to common support structure. Thus, for example, the work element of the invention may comprise a pair of folding elements employed for folding planar box blanks. In this embodiment of the invention, a pair of carriages will be mounted on a support rail similar to that described hereinbefore and each of the carriages will include a pivotally mounted arm which extends from the carriages and is employed for folding flaps of the box blank. As described above, during the folding operation, the bearing means (for example roller means 16) will be in their retracted position and the selectively adjustable securing means, such as clamping members 22, will be moved to their support rail engaging positions to fix the position of the carriages relative to each other and to the support rail. Where it is desired to move the pair of carriages so as to increase or decrease the distance therebetween, the clamping members will be moved to their open (non-rail engaging) positions and the roller means 16 will be moved into their rail engaging positions. The carriages may then be moved along the support rail by means of the roller means to desired predetermined positions.

It will also be apparent that any number of work elements may be employed with any number of carriages, rollers and clamp members in accordance with the present invention and may be positioned relative to each other and relative to a support rail.

I claim:

1. Apparatus for positioning a work element on a support rail, comprising, in combination, at least one carriage adapted to be movably mounted on said support rail said carriage including a top member adapted to be supported on said support rail, and at least one side surface member connected to said top member and depending adjacent said support rail, so that said work element may depend therefrom;

bearing means operably connected to said carriage and adjustable between engaging and retracted positions, said bearing means adapted to contact said support rail when in its engaging position and facilitate movement of said carriage along said rail;

means for selectively positioning said bearing means between engaging and retracted positions, said means comprising over-center toggle mechanisms connected to said bearing means, said toggle mechanisms movable between first and second positions, so that said bearing means may be in its engaging position when said toggle mechanism is in its first position and said bearing means may be in its retracted position when said toggle mechanism is in its second position; and means for preventing the advance of said carriage along said support rail when said bearing means is in its retracted position, said means being adjustably connected to said carriage and adapted to engage said support rail.

2. The apparatus in accordance with claim 1 wherein said bearing means comprise roller means.

3. The work element in accordance with claim 1 wherein said means for selectively positioning said bearing means between engaging and retracted positions comprises manually operable means.

4. The apparatus in accordance with claim 1 wherein said bearing means comprises at least a pair of rollers.

5. The apparatus in accordance with claim 1 wherein said over-center toggle mechanisms comprise a base member connected to said carriage; a first link member pivotally connected to said base member; a control member pivotally connected to said base member; and a second link member pivotally connected to each of said control member and said first link member; said bearing means being connected to said first link member, whereby pivotal movement of said control member causes corresponding pivotal movement of said second link member which in turn causes pivotal movement of said first link member and movement of said bearing member to the desired position.

6. The apparatus in accordance with claim 1 wherein said means for preventing the advance of said carriage comprises at least two clamp members.

7. The apparatus in accordance with claim 1 wherein said clamping member comprises a base member secured to said carriage; a jaw member pivotally connected to said base member; a control member pivotally connected to said jaw member; a link member pivotally connected to each of said control member and said base member, whereby movement of said control member causes corresponding movement of said jaw member into a desired position.

8. The apparatus in accordance with claim 1 wherein said means for preventing the advance of said carriage along said support rail comprises at least one clamp member adapted to be actuated to engage said support rail when said bearing means is in its retracted position.

9. The work element in accordance with claim 1 wherein said carriage includes a pair of side surface members connected to a top member, said top member being adapted to be supported on a support rail.

10. The apparatus in accordance with claim 1 wherein said bearing means comprise first and second rollers operatively connected to said carriage in close proximity to said top member of said carriage and adapted to contact a top portion of said support rail and lift said carriage out of contact with said top member when said bearing means are in their engaging position.

11. The apparatus in accordance with claim 1 wherein said work element comprises a stitching head.

* * * * *